Patented July 19, 1938

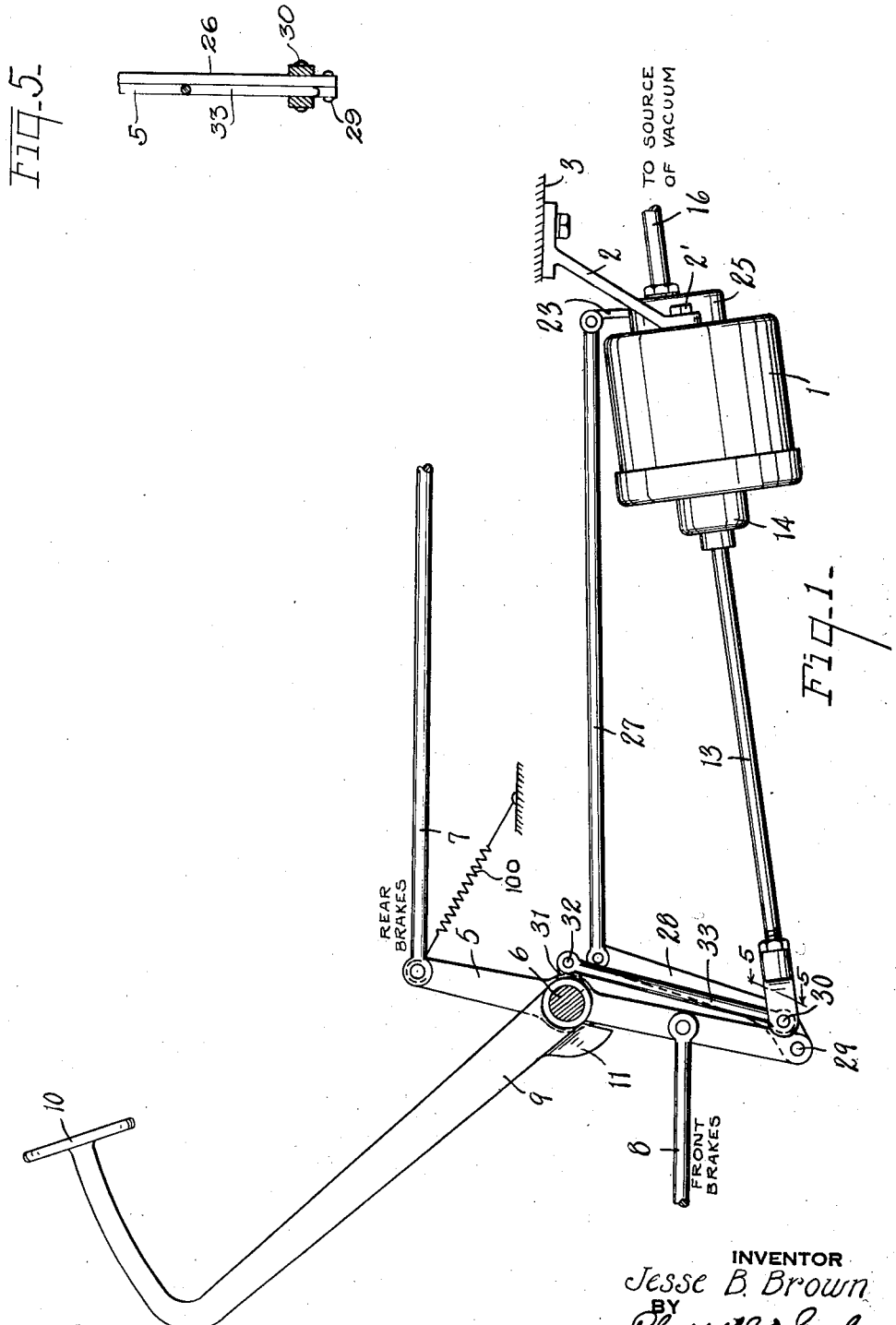

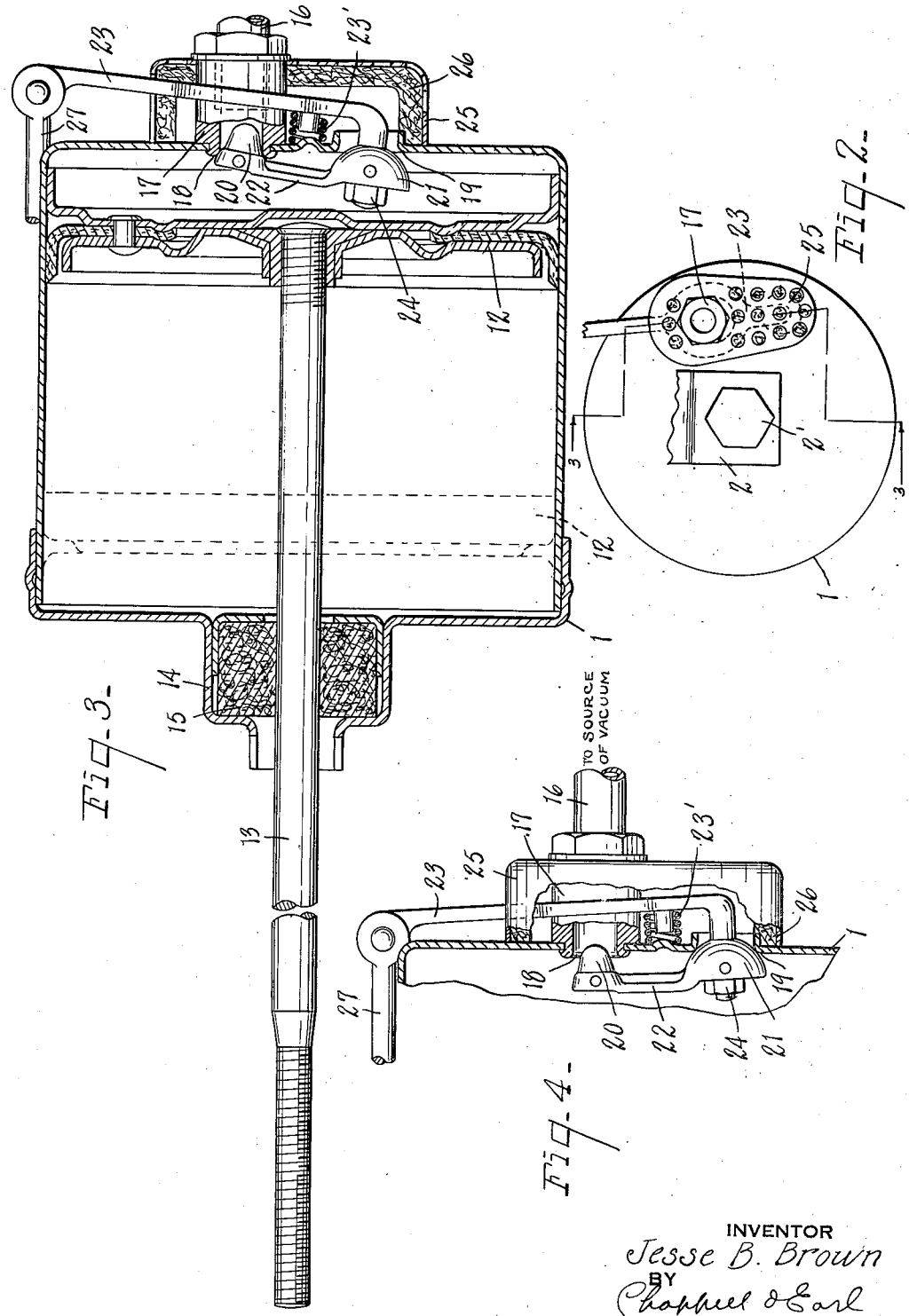

2,124,454

UNITED STATES PATENT OFFICE 2,124,454

VACUUM BRAKE STRUCTURE

Jesse B. Brown, Detroit, Mich., assignor, by mesne assignments, to Velvet Power Brake Company, Detroit, Mich., a corporation of Michigan Application April 13, 1933, Serial No. 665,978
Renewed March 19, 1937

11 Claims. (Cl. 121—46.5)

This invention relates to improved vacuum brake structures for automobiles or for vehicles generally.

The objects of the invention are:

First, to provide an improved cylinder structure with improved valve mechanism.

Second, to improve the valve mechanism by reducing the number of parts and eliminating the machine work thereon.

Further objects and advantages pertaining to details and economies of construction and operation will appear from the description to follow. Preferred embodiments of my invention are illustrated in the accompanying drawings, in which:

Fig. 1 is a side elevation view of the essential parts of a brake mechanism embodying the features of my invention, the supports for the same being indicated diagrammatically.

Fig. 2 is an enlarged detail end elevation of the vacuum power cylinder with the valve in position.

Fig. 3 is a detail sectional elevation view on the irregular plan indicated by irregular line 3—3 of Fig. 2, the valve structure being sectioned on the slightly oblique line and the cylinder part in vertical central section as shown, the valve being shown with the vacuum closed and the air vent open.

Fig. 4 is an enlarged detail sectional view of the valve structure on the same plane as Fig. 3 with the valve to the vacuum connection open and the air vent closed.

Fig. 5 is a detail sectional view taken on line 5—5 of Fig. 1.

The parts will be identified by their numerals of reference which are the same in all the views.

I is the vacuum power cylinder. This is supported by a bracket 2 secured by bolt 2' to the head end of the cylinder and to the frame 3 of the automobile. 5 is the brake lever pivotally fulcrumed on the fixed cross shaft 6. 7 is the brake rod to the rear brakes and 8 is the brake rod to the front brakes which brakes may be of any desired construction.

9 is the brake pedal lever also fulcrumed at 6 provided with a pedal 10 and with a lug 11 for engaging the brake lever 5 to actuate the same from the brake pedal lever. The lug 11 engages the edge of lever 5 as the brake pedal is depressed and rotates lever 5 in a counterclockwise direction as viewed in Fig. 1. 12 is the piston, preferably of the trunk type, constructed to reciprocate in the said cylinder. It is provided with a piston rod 13 for applying power to the brakes. The piston rod extends through the cylinder cover and is surrounded by a cup-like shell 14 in which the piston rod has considerable lateral movement due to the clearance in the left end of the piston, as illustrated in Fig. 3. The cup supports dust filter material 15 to filter the dust from the air entering the cylinder. The cylinder cover is integral and a connection 16 extends therefrom to the engine manifold or other means for creating vacuum or suction for the operation of the cylinder. This pipe of course might connect to a vacuum tank.

The coupling 17 for connection 16 extends through a port opening in the end of the cylinder and is provided with a valve seat 18. An additional valve seat 19 is formed by a struck-up portion of the cylinder head. A conical valve 20 fits into the valve seat 18, and has a spherically formed seating portion conforming to a corresponding valve seat to permit rocking of the same. A valve 21 fits into the valve seat 19, the contacting parts being spherical to seat and to permit of freedom of rocking movement.

Valves 20 and 21 are rigidly connected by an arm 22. Valves 20 and 21 and arm 22 are preferably formed from a stamping in a single piece, although they may be otherwise produced. Actuating lever 23 is secured to the valve 21 extending axially through the same and being retained in place by clamp nut 24. This lever is apertured to embrace the coupling 17 and is guided thereby. Spring 23' is interposed between the lever 23 and the cylinder head, causing the same to tend to seat both of the said valves. In operation the upper end of lever 23 (see Fig. 3) is moved toward or away from the cylinder.

Dust cap 25 surrounds the valves being provided with felt or fibrous filter material 26 to prevent dust entering the cylinder. Valve connecting rod 27 extends from the valve lever 23 to the auxiliary operating lever 28, see Fig. 1, being pivoted at both ends. This auxiliary operating lever is fulcrumed at 29 at the lower end of the brake lever 5. Piston rod 13 is pivotally connected by a suitable yoke at 30 to the said auxiliary lever 28, the relations of the pivots 29 and 30 clearly appearing in Fig. 1. The same are slightly out of alinement with the axial line of piston rod 13, the pivot 30 being in the disposition there shown a little more elevated than the pivot 29. The lever 28 is a bent lever with the bend toward the vacuum cylinder and the pivot 30 is at the bend of the lever and out of line with the ends of the lever. On the hub of the brake lever 9 is a short lever arm 31 which is connected at pivot 32 by a downwardly extending link 33 to the said pivot 30.

To explain operation of my improved brake, reference will be had to Fig. 1. When pressure is applied to the pedal 10 to depress the same, the lever 9 moves in a counterclockwise direction which swings the arm 31 upwardly in a counterclockwise direction. This motion through the link 33 swings the pivot 30 upwardly, swinging the upper end of lever 28 to the left and pulling valve rod 27 to the left to open the vacuum controlling valve 20 swinging it from the position shown in Fig. 3 to the position shown in Fig. 4. The piston rod 13, having considerable lateral movement, allows for this upward movement of the pivot 30 which is very slight. The opening of the valve 20 and the closing of the valve 21 permits the vacuum to draw the piston from the position shown in dotted lines in Fig. 3 toward the other end of the cylinder and eventually to the position shown in full lines in Fig. 3, if the brake is fully applied.

As the piston moves from this position, piston rod 13 pulls against the pivot 30 and in turn pulls on the pivot 29 swinging the lever 5 in a counterclockwise direction to apply the brakes. If the brake pedal 10 is depressed and held at any position, the cylinder operates, moving the piston rod 13 to the right and the lever 5 and lever 28 move and tend to overtake the short arm 31. As the short arm 31 is overtaken, the link 33 reacts thereagainst, pressing downwardly on the pivot 30 which swings the lever 28 in a clockwise direction which in turn moves the valve rod 27 to the right to close the valve 20 and stop the movement of the piston. This permits perfect control of the brake as it is held in any position corresponding to the position of the pedal 10.

In the event that the power cylinder fails, the brake lever 5 is actuaterd by the lug 11 on the pedal lever 9 so that the brake can be applied by the foot. The lug 10 is offset from lever 9 to engage the edge of lever 5 so that as lever 9 is rotated by depression of pedal 10, the lug 11 forces lever 5 in a counterclockwise direction, as viewed in Fig. 1. Also with the preferred construction, the cylinder is of such dimensions as to partially do the work and cooperates with the foot pedal in applying the brake, a small part of the work being done by the work of the operator.

When the brake pedal 10 is released or pressure is relieved on it, the brake spring 100 reacts to move the same toward the foot, the valve rod 27 is then pushed backwardly and the operation is repeated until the foot is entirely relieved when the valve swings to the position indicated in Fig. 3, cutting off the vacuum and opening the cylinder vent, when the brake spring 100, which is here illustrated as connected to the upper end of lever 5 to pull the same in a clockwise direction, as viewed in Fig. 1, but which may be located elsewhere in any position to accomplish the release of the brakes, releases the brake readily for a repetition of the operation.

The construction and relationship of the lever arm 28 to the valves is such that for a given movement of the arm it causes the air admission valve 21 to open and close at a faster rate than the vacuum admission valve 20. This operation results from the fact that the pivotal connection of the lever arm to the rod 27 is closer to the vacuum admission port than the air admission port. This difference in action enables the air admission valve to quickly leave its seat upon release of the brakes and atmospheric air rapidly fills the cylinder 2 before the head of the piston. Quick release action is thus obtained.

The provision of rigid connecting means between the valves 20 and 21 and the ability of the valves and their respective valve seats to alternately function as fulcrums about which the leverage action takes place eliminates all valve lap or loss of movement between the time one or the other valve is opened. The change of the fulcrum point from one valve to the other is practically instantaneous. Likewise, the complete closing of one valve and the commencement of the opening of the other valve is practically instantaneous. Thus the valve control of the cylinder is extremely sensitive to actuating movements. Also, as each valve acts as a fulcrum it rocks in its seat and the sliding contact of the spherical surface of the valve with its seat helps to keep the latter clean.

While I have shown my improved vacuum cylinder in combination with a brake pedal lever connected to operate the brake in conjunction with the brake cylinder, I desire to state that my improved cylinder and valve can be manipulated in any way and function to apply the brake without the auxiliary connecting feature.

Having thus described my invention, what I claim as new and desire to secure by Letters Patent is:

1. In an engine structure, a cylinder having a pair of ports, valves for said ports having inwardly facing seats of a contour to seat spherical valves, rigidly connected valves of spherical contour adapted to fit said seats and pivot thereon, a lever having a rigid connection extending through one of said ports and rigidly secured to the corresponding valve, and means adapted to seat said valves, whereby on the actuation of said lever, the valves will be opened and closed alternately, the closed valve serving as the fulcrum of the lever for the opening valve.

2. In an engine structure, a cylinder having a pair of ports, valves for said ports having inwardly facing seats of a contour to seat spherical valves, rigidly connected valves of spherical contour adapted to fit said seats and pivot thereon, valve actuating means extending through one of said ports and rigidly secured to the corresponding valve, and means adapted to seat said valves, whereby on the actuation of said valve actuating means, the valves will be opened and closed alternately, the closed valve serving as the fulcrum for the opening valve.

3. In an engine structure, a cylinder having a pair of ports, said ports having inwardly facing seats; rigidly connected valves adapted to close outwardly and fit said seats, and a valve actuating lever means with an arm extending through one of said ports in operation and secured to the corresponding valve, adapted to open one valve while closing the other, the valves and seats alternately serving as fulcrums for said lever.

4. In an engine valve structure, double ports having seats of a contour to seat spherical valves, rigidly connected valves of spherical contour adapted to fit said seats and pivot thereon, and means for actuating said valves rigidly connected to one valve, whereby on the actuation of said valve actuating means the valves will be opened and closed alternately, the closed valve serving as a fulcrum for the opening valve.

5. In an engine valve structure, double ports having seats of a contour to seat spherical valves, rigidly connected valves of spherical contour adapted to fit said seats and pivot thereon, and an arm connected to said valves and disposed through one of the ports and connected to act as a lever, whereby on the actuation of said valve actuating means the valves will be opened and closed alternately, the closed valve serving as a fulcrum for the opening valve.

6. Control mechanism for a cylinder comprising, in combination, a cylinder having a pair of adjacent ports, said ports having inwardly facing seats, rigidly connected valves adapted to close outwardly and fit said seats, and a valve actuating lever means with an arm extending through one of said ports in operation and secured to the corresponding valve, adapted to open one valve while closing the other, the valves and seats alternately serving as fulcrums for said lever, and means closer to one of said valves than the other for pivoting said lever means whereby said valves are moved relative to their seats at different speeds for the same pivotal movement of said lever means.

7. Valve control mechanism comprising, in combination, a support having a pair of ports, said ports having valve seats opening on one side of said support, a lever positioned on the opposite side of said support having a part thereof extending through one of said ports, a valve head on said part adapted upon movement of said lever in one direction to seat upon the valve seat of the port through which said part extends, a valve head engageable with the valve seat of said other port, and rigid means connecting said valve heads together and adapted upon movement of said lever to cause said valve heads to alternately engage their respective valve seats and when thus in engagement to form a fulcrum about which said lever may be operated.

8. Valve control mechanism comprising, in combination, a support having a pair of ports therethrough, said ports having valve seats opening on one side of said support, a rigid element on one side of said support carrying a pair of valve heads corresponding in position to said valve ports and adapted to engage with the valve seats thereof upon movement of said element, a lever arm on the side of said support opposite to said element and having a part thereof extending through one of said ports and attached to the valve head corresponding to said port, said part forming a rigid connection between said lever arm and said element carrying said pair of valve heads whereby upon swinging movement of said lever arm the element is caused to alternately seat said valve heads upon their respective valve seats and when a valve head is thus seated to form a fulcrum about which the lever arm may be swung.

9. Valve control mechanism comprising, in combination, a support having a pair of ports, said ports having valve seats of a contour to seat spherical valves, a pair of spherical valves, an element on one side of said support connecting said valves into a rigid unitary structure, and a lever arm on the opposite side of said support having one end thereof bent and arranged to pass through one of said ports, and means rigidly connecting the bent end of said lever arm to said element.

10. Valve control mechanism comprising, in combination, a wall having a pair of ports opening therethrough, valve control means for opening and closing said ports including a pair of valves on one side of said wall, means rigidly connecting said valves together, and valve actuating means including a lever arm on the side of said wall opposite to said valves having a part passing through one of said ports and rigidly connected to said valve control means, said part forming the sole support for said control means including said pair of valves and adapted upon movement of said lever arm to alternately seat one or the other of said valves, the valves when each is thus seated forming a fulcrum about which the other valve may be swung as the lever is operated.

11. In combination with a cylinder having an air admission port and a vacuum admission port, inside valve means for opening and closing said ports, a rigid element connecting said valve means together into a unitary structure, an exterior valve operating member having a part extending through one of said ports and secured to the valve means acting to close said port, said operating member adapted to open one port while closing the other, the valve means alternately serving in their closed positions as fulcrums for said operating member, said member mounted so that for the same amount of movement it operates the valve means for the air admission port at a faster rate than the valve means for the vacuum admission port.

JESSE B. BROWN.